United States Patent
Krishnaswamy et al.

(10) Patent No.: US 7,088,920 B2
(45) Date of Patent: Aug. 8, 2006

(54) WAVELENGTH AND PATH ASSIGNMENT IN WAVELENGTH DIVISION MULTIPLEXED RING NETWORKS

(75) Inventors: Murali Krishnaswamy, Piscataway, NJ (US); Yufei Wang, Holmdel, NJ (US)

(73) Assignee: Merlton Networks US Inc., Wilmington, DE (US)

( * ) Notice: Subject to any disclaimer, the term of this patent is extended or adjusted under 35 U.S.C. 154(b) by 671 days.

(21) Appl. No.: 10/038,880

(22) Filed: Dec. 31, 2001

(65) Prior Publication Data
US 2004/0208559 A1    Oct. 21, 2004

(51) Int. Cl.
*H04B 10/20* (2006.01)

(52) U.S. Cl. .......................................... 398/58; 398/57
(58) Field of Classification Search ............... 398/5, 398/57, 58, 59, 69, 61, 63
See application file for complete search history.

(56) References Cited

U.S. PATENT DOCUMENTS

| 5,999,288 A | 12/1999 | Ellinas et al. ............... 359/119 |
| 2003/0020977 A1* | 1/2003 | Smith et al. ................ 359/110 |

* cited by examiner

*Primary Examiner*—Christina Y. Leung
(74) *Attorney, Agent, or Firm*—Mayer & Williams PC; Stuart H. Mayer, Esq.; Karin L. Williams, Esq.

(57) ABSTRACT

A method is provided for establishing a service connection between first and second network nodes in a WDM optical network for a plurality of network users. The method begins by receiving, from each network user, user-preferences prioritizing a plurality of decision criteria defining preferable characteristics of the service connection. Next, a prescribed algorithm is used to select a path and a channel wavelength at which information is to be conveyed over the path between the first and second nodes. The selection is based on the plurality of decision criteria as prioritized in accordance with the user-preferences. Finally, the first and second network nodes are interconnected over the selected path with the selected channel wavelength.

12 Claims, 2 Drawing Sheets

WAVELENGTH AND PATH ASSIGNMENT IN WAVELENGTH DIVISION MULTIPLEXED RING NETWORKS

FIELD OF THE INVENTION

The present invention relates generally to a WDM optical communications networks, and more particularly to a technique for selecting an appropriate path and wavelength over which a service connection is to be established in a WDM optical communications network.

BACKGROUND OF THE INVENTION

Current and next generation optical networks are capable of transporting multiple wavelengths on the same fiber by using Dense Wavelength Division Multiplexing (DWDM) technology. Typical systems are capable of transporting thirty-two or more channels, at ten Gigabits per second (Gb/s) rate each. A wavelength division multiplexed optical transmission system employs plural optical channels, each channel being assigned a particular channel wavelength. In a WDM system, optical channels are generated, multiplexed to form an optical signal comprised of the individual optical channels, transmitted over a waveguide, and demultiplexed such that each channel wavelength is individually routed to a designated receiver.

Many networks today are based upon fiber-ring architectures, as evidenced by the proliferation of SONET/SDH time-division multiplexing (TDM) rings all the way from the long-haul backbone to the metropolitan and regional areas. Most large backbone rings represent significant investments on the part of service providers, and expectedly will have longer lifetimes. As a result, ring architectures will clearly play a major role in the evolution of optical networks. Given this large, entrenched base of ring topologies, currently many optical communication network operators are planning for a migration to equivalent dynamic optical ring architectures. Dynamic optical rings can be defined as fiber rings with dynamic lightpath provisioning capabilities such as routing, add/drop and protection. (A lightpath refers to the combination of the selected wavelength and path.) These optical wavelength routing rings, commonly also referred to as optical add-drop ring multiplexer (O-ADM) rings, will form the mainstay architecture for most metro/regional and even long-haul networks, helping operators ease their transition to future optical (mesh or hybrid ring-mesh) networks. Such systems typically include a plurality of nodes located along the ring. At least one optical add/drop element associated with each node is typically connected to the ring with optical connectors. The optical add/drop element permits both addition and extraction of channels to and from the ring. A particular node that allows the addition and extraction of all the channels is commonly referred to as a hub or central office node, and typically has a plurality of associated add/drop elements for transmitting and receiving a corresponding plurality of channels to/from other nodes along the ring.

In order to establish communication between any two nodes in an optical ring network both an appropriate path and an appropriate channel wavelength over which the information is to be conveyed must be selected. This task is performed by a routing and wavelength assignment algorithm that is typically implemented in a network management element. In most cases this network management element is the node itself. However it is also possible to implement the above mentioned algorithm in an external EMS (Element Management System) or NMS (Network Management System). Current algorithms generally employ a fixed set of criteria to determine the best route and wavelength, which are usually based on such factors as the shortest path between the nodes and the utilization rate and fragmentation of the various wavelengths. Since the algorithm is used network-wide to allocate resources for all the customers using the network, individual customers cannot select their own criteria that is of most importance to them. For example, one customer may wish to select a channel and path primarily on the basis of wavelength utilization efficiency, while another customer may wish to make the selection based primarily on the cost-savings that can be achieved by using a pre-existing transponder pack (TRP). This can currently only be achieved if the network management element can implement a different algorithm for different sets of criteria, which can be difficult and impractical to do.

Accordingly, there remains a need to implement a practical wavelength assignment and path selection process in a ring network in accordance with criteria that meets individual customers' specific needs rather than in accordance with a fixed set of criteria that are imposed on them.

SUMMARY OF THE INVENTION

In accordance with the present invention, a method is provided for establishing a service connection between first and second network nodes in a WDM optical network for a plurality of network users. The method begins by receiving, from each network user, user-preferences prioritizing a plurality of decision criteria defining preferable characteristics of the service connection. Next, a prescribed algorithm is used to select a path and a channel wavelength at which information is to be conveyed over the path between the first and second nodes. The selection is based on the plurality of decision criteria as prioritized in accordance with the user-preferences. Finally, the first and second network nodes are interconnected over the selected path with the selected channel wavelength.

In accordance with one aspect of the invention, the WDM optical network is a WDM optical ring network.

In accordance with another aspect of the invention, the user-preferences rank the plurality of decision-criteria. The ranking may reflect an absolute priority in which higher ranked ones of the decision-criteria are decisive over lower ranked decision-criteria.

In accordance with yet another aspect of the invention, the plurality of decision-criteria include at least one decision-criterion selected from the group consisting of in-service wavelengths, path length, in-service TRP savings, fragmentation, and utilization rate.

DETAILED DESCRIPTION

Figure 1:
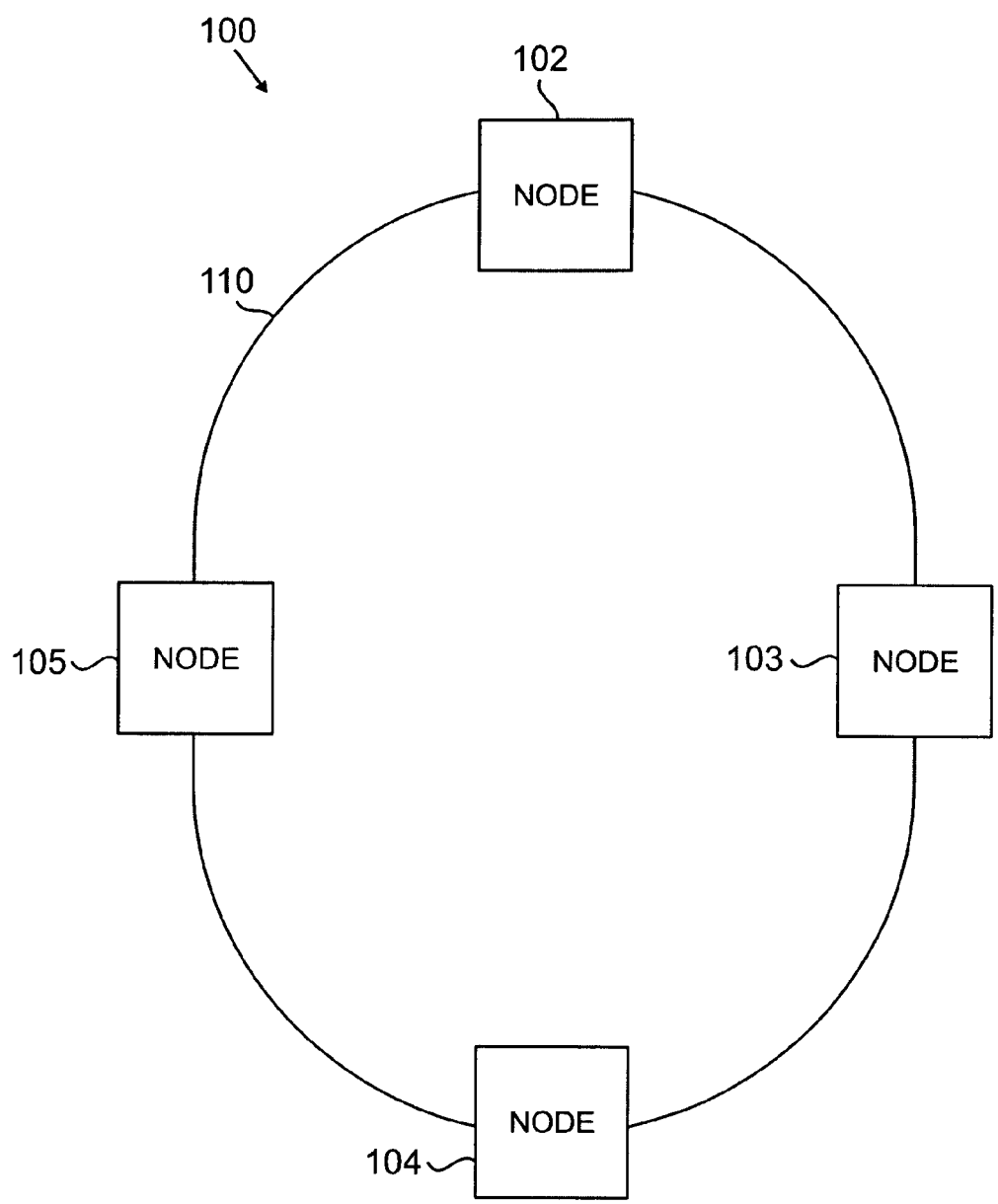
FIG. 1 shows a functional block diagram of an exemplary WDM ring network in which the present invention may be employed.

FIG. 1 shows a functional block diagram of a WDM ring network 100 in accordance with the present invention. Ring network 100 includes a plurality of nodes 102–105 connected along a continuous, or looped, optical path 110. Each of these nodes is typically linked by a segment or link of optical fiber. Optical path 110 represents a bi-directional link that is realized by two uni-directional physical fibers. While the ring network 100 shown in FIG. 1 includes only a single optical path, more generally there may be two or more such paths interconnecting the nodes 102–105, some of which may be reserved for protection or control channels.

For purposes of illustrating the principals of the invention the decision criteria used to selected the best path and wavelength when establishing a service between nodes may include the following: in-service wavelengths, path length, in-service transponder pack (TRP) savings, fragmentation, and the utilization rate. Each of these criteria will now be briefly defined.

The first criterion, in-service wavelengths, refers to the condition that it is preferable to select a wavelength that is already being used in the network instead of selecting a wavelength that is currently not being used in the network. (In effect this may result in the selection of the longer path between the nodes for lightpath setup). This criterion is generally important because some optical services like DPRING (Dedicated Protection Ring) require full wavelength availability over the entire ring. If a new wavelength were used for each (non-DPRING) connection, fewer possible DPRING-like services could be provisioned in the future.

The second criterion, the path length, refers to the number of segments or links over which the service is implemented. In a ring network, there are two paths that may be selected, clockwise and counterclockwise, and generally the shortest path will be preferable. There are many advantages to using the shortest path: a larger (remaining) portion of the selected wavelength is available for future connection requests; since the shortest path traverses fewer nodes there is less chance of a failure; and the optical power requirements are less for the shorter connection.

The third criterion is the TRP savings. A TRP is the interface card in the node that accepts customer signals on one side and transports it to other nodes over a selected wavelength on the other side. This criterion specifies that it is preferable to use an existing TRP, which may be left over from a de-provisioned previous connection or an unused new connection, rather than install and use a new TRP. This criterion is important because TRPs are expensive and thus it is prudent to first use any available TRPs before using a new one.

The fourth criterion, the fragmentation of each wavelength, is defined as the summation of the number of contiguous links that are in-service and the number of contiguous links that are not in service for the given wavelength. Generally, a wavelength with a lower fragmentation is preferable because a highly fragmented wavelength cannot accommodate new connections that traverse many nodes, i.e., a relatively long path.

The fifth criterion, the utilization rate of a given wavelength, refers to the ratio of the number of links over which a given wavelength is in-use relative to the total number of links in the network. A wavelength with a higher utilization rate will generally be preferable to a wavelength with a lower utilization rate because it is prudent to fully utilize one wavelength before going to the next one.

It should be noted that the aforementioned decision criteria are exemplary and that the present invention encompasses the use of any decision criteria that are available.

Figure 2:
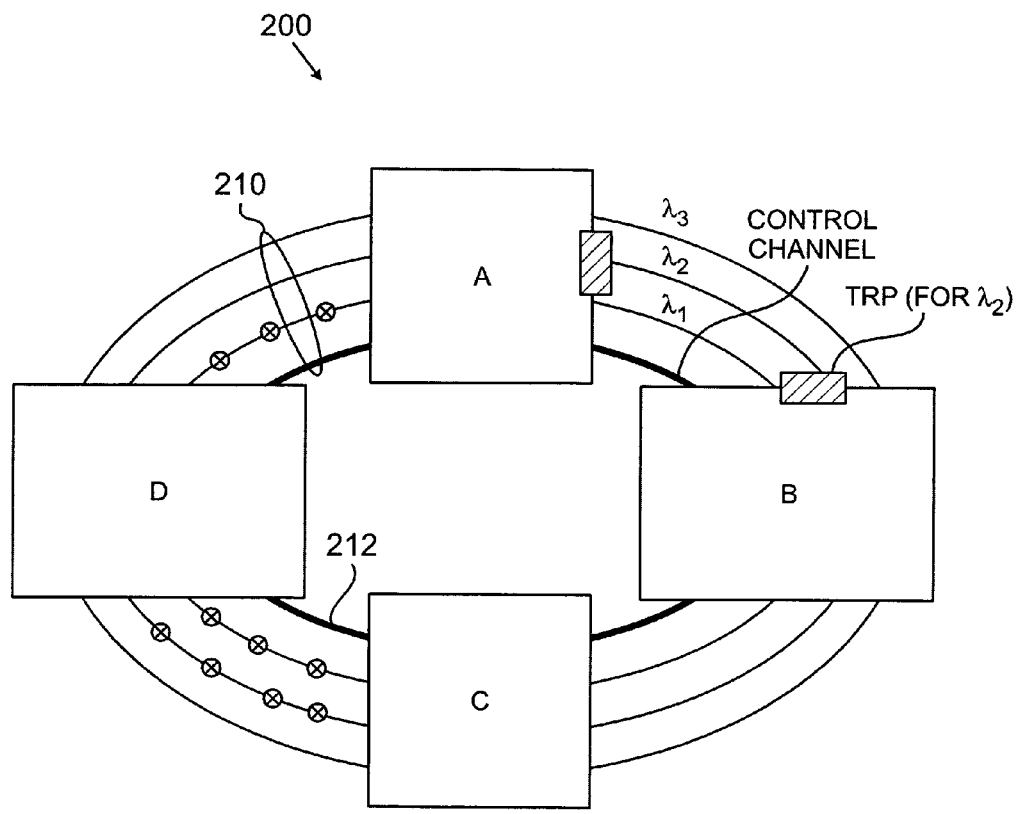
FIG. 2 shows a WDM ring network similar to the ring network of FIG. 1, which is used to illustrate exemplary decision-criteria.

To further facilitate an understanding of the present invention, the decision criteria will be illustrated with respect to the ring network 200 shown in FIG. 2. Ring network 200 includes nodes A, B, C and D, which are connected by a single optical path 210 and a control channel 212. As shown, optical path 210 supports wavelengths $\lambda_1$, $\lambda_2$, and $\lambda_3$. All three wavelengths are available to provide service along any links of the optical path, except that $\lambda_1$ is unavailable on the links between nodes A and D and between nodes D and C, and $\lambda_2$ is unavailable between nodes D and C. Assume a service is to be established between nodes A and B. In this case, the first decision criterion would select $\lambda_1$ or $\lambda_2$ because $\lambda_3$ is not currently in-service. The second decision criterion, the path length, would select path A-B, which is one link in length, over path A-D-C-B, which is 3 links in length. The third decision criterion, the in-service TRP, would select $\lambda_2$ because, as indicated in FIG. 2, there is an available TRP. The fourth decision criterion, the current fragmentation, is "2" for $\lambda_1$, "2" for $\lambda_2$ and "1" for $\lambda_3$. The new fragmentation is "2" if $\lambda_1$ is selected, "4" if $\lambda_2$ is selected, and "2" if $\lambda_3$ is selected. Hence the increase in fragmentation for $\lambda_1$ is "0", for $\lambda_2$ is "2" and for $\lambda_3$ is "1". Since it is preferable to minimize fragmentation, $\lambda_1$ is preferred. The fifth decision criterion, the utilization rate, is "½" for $\lambda_1$, "¼" for $\lambda_2$ and "0" for $\lambda_3$. Since a path with maximum utilization rate is preferred, $\lambda_1$ will be selected.

In accordance with the present invention, the routing and wavelength assignment algorithm selects the path and wavelength for a given service based on the relative weight that is given to each of the decision criteria that are employed by the algorithm. The algorithm employs a metric that is defined as the weighted sum of the decision criteria. The relative weights are customer-selectable parameters that allow the customer to prioritize those criteria in a way that best meet its needs at any given time for any given service to be established. By allowing the customer to select different sets of weights, the customer is effectively allowed to select from among different algorithms that can be used to determine the best path and wavelength for a given service. However, although the customer is provided with such a high degree of flexibility in establishing a service, the network only needs to implement a single routing and wavelength assignment algorithm.

The metric employed in the present invention may be established in many different ways that incorporate customer-selectable weighting parameters. The following exemplary metric is presented to illustrate some of the factors and considerations that need to be taken into account when developing such a metric. Accordingly, it should be understood that the present invention is not limited to this particular metric.

The metric development process begins by quantifying each decision criterion with a numerical value. For example, numerical values may be assigned to the previously mentioned decision criteria in the following manner. With respect to the first decision criterion, the in-service wavelength, a value of "1" may be assigned to a wavelength currently in-service and a value of "0" to a wavelength that is not currently in service. With respect to the second criteria, the path length, its numerical value may be equal to the ratio of the path length (in hops) to the total size of the ring (also in hops). The third criteria, the in-service TRP savings, may be assigned a numerical value equal to the actual number of TRPs that are being reused. Likewise, the fragmentation may be assigned a numerical value equal to the negation of the actual increase in fragmentation that arises from using a given wavelength. Finally, the utilization rate can be simply assigned a numerical value equal to the ratio of the number of links over which a given wavelength is in-use relative to the total number of links in the network.

A connection or lightpath for a given service between a set of nodes in the network is specified by a path and a wavelength. A feasible connection refers to a connection in which the wavelength has sufficient capacity to accommodate the service along its path. The metric of merit for any feasible connection C may now be defined as $$M(C)=W_1 V_1(C)+W_2 V_2(C)+W_3 V_3(C)+W_4 V_4(C)+W_5 V_5(C)$$

Where $V_1(C)$, $V_2(C)$, $V_3(C)$, $V_4(C)$, and $V_5(C)$ respectively represent the numerical values of the 5 decision criteria that have been specified above and $W_1$, $W_2$, $W_3$, $W_4$, and $W_5$, respectively represent the customer-selectable weighting factors assigned to each of the 5 decision criteria. It should be noted that only the relative weights are of importance, not their absolute values.

In operation, the algorithm simply examines all the feasible connections for a given service and selects the one with the greatest value of the metric M(C).

The weighting factors should be selected to reflect the correct priority relationships that are desired. For example, an absolute priority may be selected in which the criteria are ranked so that higher ranking criteria are always decisive over lower ranking criteria, except in the case of a tie. Alternatively, the priority relationships may be selected to reflect a quantitative priority in which the all the criteria contribute to the result based on their numerical values.

If an absolute priority relationship is to be employed, the customer-selectable weighting factors need to have values that are of a different order of magnitude from one another. In this way contributions to the metric of merit from lower priority criteria will never be determinative over higher priority criteria. For example, if $W_1$, $W_2$, $W_3$, $W_4$, and $W_5$, respectively represent the weighting factors of the in-service wavelengths, path length, in-service TRP savings, fragmentation, and the utilization rate, then if $W_1=1$, $W_2=0.1$, $W_3=0.01$, $W_4=0.001$, and $W_5=0.0001$, the in service wavelength will the decisive criterion. Likewise, if $W_1=1$, $W_2=0.1$, $W_3=0.0001$, $W_4=0.01$, and $W_5=0.001$, the in-service wavelengths will again be the decisive criterion. Alternatively, if, for example, $W_1=0.1$, $W_2=0.01$, $W_3=1$, $W_4=0.001$, and $W_5=0.0001$, then the in-service TRP savings will be the decisive criterion.

Although various embodiments are specifically illustrated and described herein, it will be appreciated that modifications and variations of the present invention are covered by the above teachings and are within the purview of the appended claims without departing from the spirit and intended scope of the invention. For example, while the present invention has been discussed in terms of an optical ring network, it should be noted that the invention is also applicable to optical mesh networks and logical rings over optical mesh networks.

The invention claimed is:

1. A method of establishing a service connection between first and second network nodes in a WDM optical network for a plurality of network users:

receiving, from each network user, user-preferences prioritizing a plurality of decision criteria defining preferable characteristics of the service connection, wherein the user-preferences rank the plurality of decision-criteria;

selecting, using a prescribed algorithm, a path and a channel wavelength at which information is to be conveyed over the path between the first and second nodes based on the plurality of decision criteria as prioritized in accordance with the user-preferences; and interconnecting the first and second network nodes over the selected path with the selected channel wavelength, wherein the plurality of decision-criteria include in-service wavelengths, path length, in-service TRP savings, fragmentation and utilization rate.

2. The method of claim 1 wherein the WDM optical network is a WDM optical ring network.

3. The method of claim 2 wherein the plurality of decision-criteria include at least one decision-criterion selected from the group consisting of in-service wavelengths, path length, in-service TRP savings, fragmentation, and utilization rate.

4. The method of claim 2 wherein the user-preferences establish relative weights assigned to each of the decision-criteria.

5. The method of claim 4 wherein the prescribed algorithm employs a metric in which each decision-criteria is assigned a numerical value.

6. The method of claim 5 wherein the metric is defined as a sum of the products of each decision-criterion and a one of the user preferences associated therewith.

7. The method of claim 6 wherein the step of selecting the path and the channel wavelength includes the step of selecting a path and channel wavelength that maximizes the metric.

8. The method of claim 5 wherein the relative weights assigned to each decision-criterion reflect an absolute priority in which higher ranked ones of the decision-criteria receive a user-preference that is at least one order of magnitude higher than a lower ranked decision-criteria.

9. The method of claim 2 wherein the prescribed algorithm employs a metric in which each decision-criteria is assigned a numerical value.

10. The method of claim 9 wherein the step of selecting the path and the channel wavelength includes the step of selecting a path and channel wavelength that maximizes the metric.

11. The method of claim 1 wherein the ranking reflects an absolute priority in which higher ranked ones of the decision-criteria are decisive over lower ranked decision-criteria.

12. The method of claim 1 wherein the WDM optical network is a WDM optical mesh network.

* * * * *

UNITED STATES PATENT AND TRADEMARK OFFICE
CERTIFICATE OF CORRECTION

PATENT NO. : 7,088,920 B2  Page 1 of 1
APPLICATION NO. : 10/038880
DATED : August 8, 2006
INVENTOR(S) : Murali Krishnaswamy et al.

It is certified that error appears in the above-identified patent and that said Letters Patent is hereby corrected as shown below:

Cover Sheet, (73) Assignee, change "Merlton" to -- Meriton -- .

Specification, Col. 1, line 60, after "network", insert -- , -- .

Specification, Col. 1, line 66, after "However", insert -- , -- .

Specification, Col. 3, line 9, after "invention", insert -- , -- .

Specification, Col. 3, line 10, after "to", change "selected" to -- select --.

Specification, Col. 3, line 40, after "transports", change "it" to -- them --.

Specification, Col. 5, line 14, after "$W_5$" delete -- , -- .

Specification, Col. 5, line 28, after "which" delete -- the -- .

Specification, Col. 5, line 33, after "way" insert -- , -- .

Specification, Col. 5, line 35, after "$W_5$" delete -- , -- .

Specification, Col. 5, line 39, change "in service" to -- in-service -- .

Specification, Col. 5, line 39- 40, change "wavelength" to -- wavelengths -- .

Specification, Col. 5, line 40, after "will" insert -- be -- .

Signed and Sealed this

Twenty-ninth Day of May, 2007

JON W. DUDAS
*Director of the United States Patent and Trademark Office*